(12) United States Patent
Chartrel et al.

(10) Patent No.: US 10,047,258 B2
(45) Date of Patent: Aug. 14, 2018

(54) POLYURETHANE-BASED TWO-COMPONENT ADHESIVE COMPOSITION

(71) Applicant: BOSTIK SA, La Plaine Saint Denis (FR)

(72) Inventors: Jean Francois Chartrel, Cuts (FR); Olivier Laferte, Trosly Breuil (FR); Regis Guillotte, Ribecourt Dreslincourt (FR)

(73) Assignee: BOSTIK SA, La Plaine Saint Denis (FR)

( * ) Notice: Subject to any disclaimer, the term of this patent is extended or adjusted under 35 U.S.C. 154(b) by 761 days.

(21) Appl. No.: 14/532,082

(22) Filed: Nov. 4, 2014

(65) Prior Publication Data
US 2015/0122407 A1  May 7, 2015

(30) Foreign Application Priority Data

Nov. 4, 2013 (FR) ...................................... 13 60784

(51) Int. Cl.
| | |
|---|---|
| C08L 75/04 | (2006.01) |
| C08G 18/10 | (2006.01) |
| C08K 3/36 | (2006.01) |
| C09J 175/04 | (2006.01) |
| B29C 65/52 | (2006.01) |
| B32B 37/12 | (2006.01) |
| C09J 175/06 | (2006.01) |
| B32B 37/18 | (2006.01) |
| B32B 38/00 | (2006.01) |
| C08K 3/08 | (2006.01) |
| C08K 3/26 | (2006.01) |
| C08K 3/32 | (2006.01) |
| C08G 18/76 | (2006.01) |
| B01D 63/10 | (2006.01) |
| B01D 65/00 | (2006.01) |
| C08G 18/72 | (2006.01) |
| C08G 18/79 | (2006.01) |
| C08G 18/36 | (2006.01) |
| C09J 175/08 | (2006.01) |

(52) U.S. Cl.
CPC ............ *C09J 175/06* (2013.01); *B01D 63/10* (2013.01); *B01D 65/003* (2013.01); *B32B 37/1292* (2013.01); *B32B 37/18* (2013.01); *B32B 38/0012* (2013.01); *C08G 18/10* (2013.01); *C08G 18/36* (2013.01); *C08G 18/725* (2013.01); *C08G 18/7671* (2013.01); *C08G 18/797* (2013.01); *C08K 3/08* (2013.01); *C08K 3/26* (2013.01); *C08K 3/32* (2013.01); *C08K 3/36* (2013.01); *C09J 175/04* (2013.01); *C09J 175/08* (2013.01); *B01D 2313/04* (2013.01); *C08K 2003/0818* (2013.01); *C08K 2003/0825* (2013.01); *C08K 2003/265* (2013.01); *C08K 2003/329* (2013.01); *Y10T 156/1051* (2015.01)

(58) Field of Classification Search
USPC ........................................ 524/590, 430, 442
See application file for complete search history.

(56) References Cited

U.S. PATENT DOCUMENTS

| 4,267,044 A | 5/1981 | Kroplinski et al. | |
|---|---|---|---|
| 4,359,359 A * | 11/1982 | Gerlach | ............... B01D 63/023 156/294 |
| 2006/0142532 A1* | 6/2006 | Wintermantel | ........ C08G 18/12 528/59 |
| 2009/0159206 A1* | 6/2009 | Wang | ..................... C09J 175/04 156/331.7 |

FOREIGN PATENT DOCUMENTS

| DE | 102011050220 A1 | | 11/2012 |
|---|---|---|---|
| JP | 406145281 | * | 5/1994 |
| WO | 2006/035632 A1 | | 4/2006 |
| WO | 2010/052671 A1 | | 5/2010 |

OTHER PUBLICATIONS

Search Report dated Feb. 25, 2014 issued in corresponding FR 1360784 application (pp. 1-2).
Database WPI Week 200632 Thomson Scientific, London, GB; AN 2006-306115-XP002720844.

* cited by examiner

*Primary Examiner* — Tae H Yoon
(74) *Attorney, Agent, or Firm* — Millen, White, Zelano and Branigan, P.C.

(57) ABSTRACT

The present invention relates to a polyurethane-based two-component adhesive composition. The invention also relates to the manufacture of membrane-type filtration cartridges using the two-component adhesive composition according to the invention.

15 Claims, 5 Drawing Sheets

Figure 3
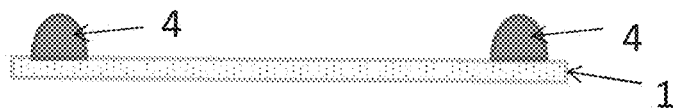
Figure 3A
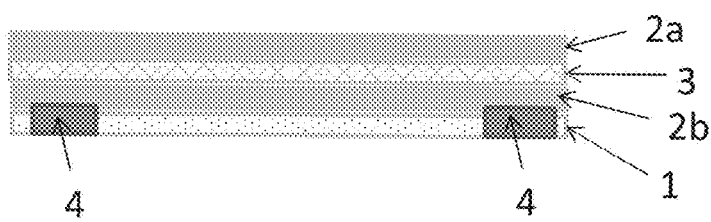
Figure 3B
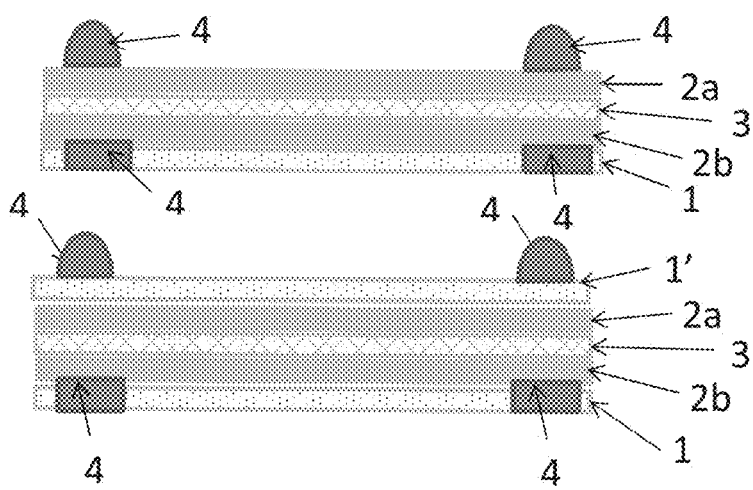
Figure 3C
Figure 3D
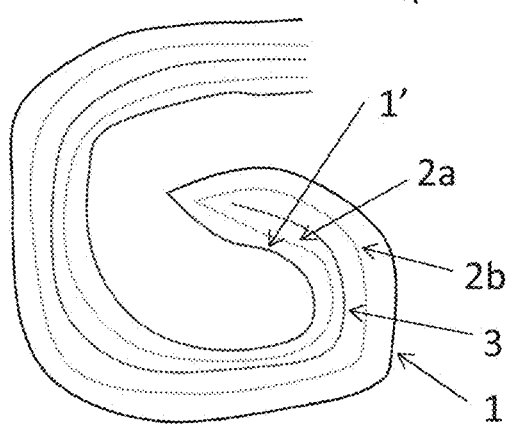
Figure 3E Figure 4
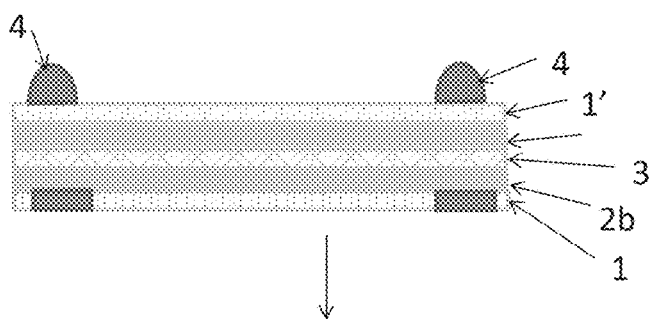
Figure 4A
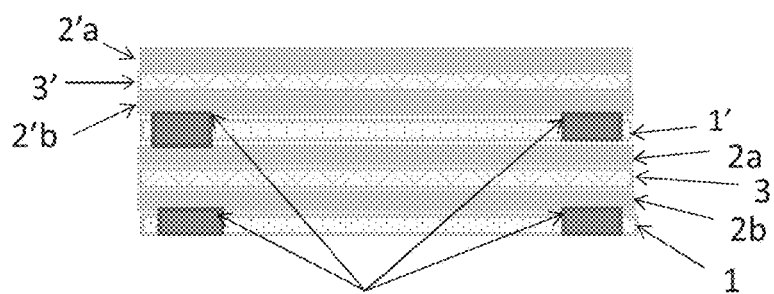
Figure 4B
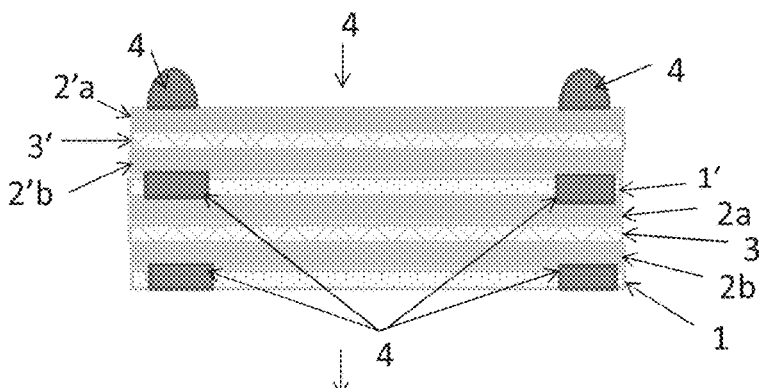
Figure 4C
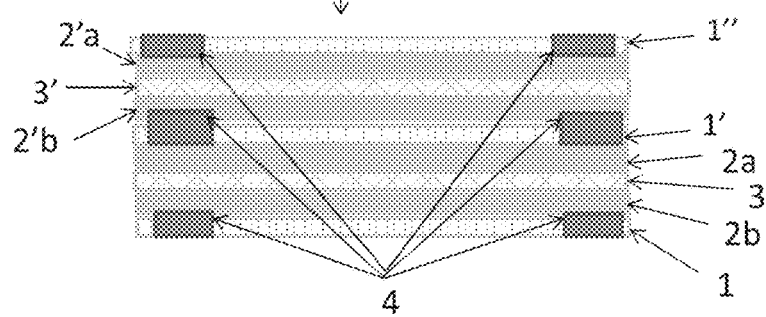
Figure 4D

POLYURETHANE-BASED TWO-COMPONENT ADHESIVE COMPOSITION

This application claims priority under 35 USC § 119(a) to French Application Serial No. 1360784, filed Nov. 4, 2013.

TECHNICAL FIELD

The present invention relates to a polyurethane-based two-component adhesive composition. The invention also relates to the manufacture of membrane-type filtration cartridges using the two-component adhesive composition according to the invention.

STATE OF THE ART

Filtration by the reverse osmosis process is carried out through a semi-permeable membrane offering the feature of stopping particles of sizes greater than or equal to a nanometre. By this process, ions, bacteria and viruses can be blocked by the membrane. The reverse osmosis process therefore makes it possible in particular to produce drinking water from brackish water or to produce treated water for power plants or the chemical and pharmaceutical industries, from seawater for example.

Another process used for the production of treated water or drinking water is a vacuum distillation process. This process has the drawback of high energy consumption.

The membranes are generally utilized in the form of filtration cartridges. In practice, for the treatment of water, there can be a succession of several cartridges, for example its passage through one or more microfiltration- then ultrafiltration-type cartridges making it possible to remove the particles of a size of the order of 10-100 nm followed by one or more reverse osmosis-type cartridges making it possible to remove the particles of a size greater than or equal to a nanometre. Placing ultrafiltration cartridges upstream of the reverse osmosis cartridges makes it possible to avoid the phenomenon of saturation (clogging) that can occur if particles with too-large dimensions are blocked by the reverse osmosis filtering membrane. Depending on the quality and type of water to be treated, the installations can contain different types of filter cartridges. There are two major categories of filter cartridges.

A first, older, category is constituted by "hollow fibre" cartridges. An adhesive is applied by inserting an adhesive composition at the ends of the fibres and applying a centrifugal force to them, the adhesive composition is thus deposited on the outer surface of each of the hollow fibres. A two-component polyurethane adhesive composition is conventionally used. The document U.S. Pat. No. 3,962,094 describes this type of filtration cartridge.

A second category of filters or filter cartridges is constituted by "membrane"-type cartridges formed from a multi-layer of several membranes and of interposed sheets generally of woven or non-woven material; said cartridges are obtained by winding the multilayer around a tube closed on the feed side, causing the fluid to infiltrate through the free drainage fabrics between each coil, and perforated along its length, a perforation through which the filtrate flows (FIG. 5).

The manufacture of "hollow fibre"-type cartridges is more complex than the manufacture of "membrane"-type cartridges. The "membrane"-type cartridge has a resistant and solid structure thanks to the multilayer structure formed by the superimposition of membranes and offers a higher filtration quality. The diameter of the pores of the hollow fibres increases with the pressure, which makes them less efficient.

The document U.S. Pat. No. 4,267,044 describes a thixotropic polyurethane composition used for gluing "membrane"-type separation systems, using for example osmotic processes. The composition described in this document comprises: (a) a prepolymer obtained by reaction between a polyol having an OH functionality of at least 2 and an organic diisocyanate, and (b) a cross-linking agent comprising a polyether polyol having an OH functionality of at least 2 and a polyether having a primary amine as terminal group.

The adhesive composition proposed by this document could not be used for the manufacture of articles subject to food contact restrictions. In fact, the amine-type compounds are considered toxic for applications such as reverse-osmosis filtration, allowing the production of drinking water.

The polyurethane-based adhesive compositions of the prior art do not make it possible to ensure optimum bonding of the membranes of a filtration cartridge. In fact, such a use requires an excellent seal, the bonding must ensure the sealing of the cartridge for the filtration to be efficient. The adhesive composition must therefore not contain air bubbles, as the polyurethane-based adhesives have a tendency to foam, due to reactivity of the NCO functions with the humidity present in the air and the substrates.

The manufacture of the filtration cartridges takes a certain time, that of superimposing the different layers. The adhesive composition must therefore have an open time that is sufficiently long to have time for superimposing and winding the layers constituting the filtration cartridge before the adhesive composition loses its performance.

Moreover, the filtration is carried out through the membrane or membranes present in the cartridge. The greater the surface area of the membrane that is free for filtration, the greater the filtration yield. The adhesive composition applied must be sufficiently cohesive (i.e. creep-resistant) not to occupy too much membrane space and thus optimize the filtration surface area, it is therefore sought to reduce the surface area occupied by the adhesive composition. Nevertheless, the adhesive composition must still allow a good impregnation of the different layers in order to ensure good sealing of the cartridge.

Furthermore, the adhesive composition must be able to be manufactured in one country then used in another country. The composition of the constituents of the two-component adhesive must therefore be sufficiently stable during storage in order to be manufactured then stored for a certain period of time, which may correspond to the duration of transport (of the order of several weeks), even at relatively high temperatures (of the order of 40° C.) before being mixed and applied to a support for bonding.

Nowadays, filtration cartridges are generally manufactured entirely manually. In particular, the polyurethane-based adhesive composition which is generally used is mixed by hand then applied, still manually, to the filtering assembly constituting the cartridge. The document WO 00/78436 describes a polyurethane-based two-component adhesive composition having a viscosity of the order of 50,000 mPa·s for use in the manufacture of membrane-type filtration cartridges.

The adhesives used for a manual application cannot be directly used in an automated application. In fact, the mechanical stresses are very different in the two types of application, and it is necessary to adjust the viscosity and thixotropy (yield point). Moreover, manual mixing tends to incorporate air and humidity in a composition, whereas mechanical mixing allows better control of this parameter.

The document WO 2010/052671 describes polyurethane-based two-component adhesive compositions comprising a resin part A and a hardener part B. This document does not disclose the compositions according to the invention. Furthermore, resin part A described in this document comprises a threshold agent selected from amines or polyamines. Now, this type of compound is not compatible with the applications referred to in the present invention, such as the production of drinking water or food packaging.

Therefore, at present no solution exists making it possible to propose a two-component polyurethane adhesive composition which can be used just as well for the manual manufacture and for the automated manufacture of "membrane"-type filter cartridges and meeting regulatory requirements, such as the standards relating to contact with food.

SUMMARY OF THE INVENTION

A first subject of the present invention relates to an adhesive composition comprising:
a composition A comprising:
  at least one unsaturated polyol $P_1$ having a number-average molecular weight ranging from 290 to 1500 g/mol, a hydroxyl value ranging from 110 mgKOH/g to 600 mgKOH/g and an unsaturation level less than or equal to 150 Wijs
  from 5 to 20% by weight of at least one filler, with respect to the total weight of composition A,
  at least one amorphous polyester,
  at least one saturated polyol $P_2$,
a composition B comprising at least one prepolymer with NCO terminations, obtained from:
  at least one polyfunctional polyol $P_3$, and
  at least one mixture of isocyanates comprising at least 60% by weight of 4,4'-diphenylmethylene diisocyanate, with respect to the total weight of the mixture of isocyanates.
Preferably, in composition A:
the polyol $P_1$ is selected from the polyester polyols, and/or
the filler has a particle size ranging from 1 to 10 μm, and/or
the amorphous polyester is selected from the aliphatic, cycloaliphatic and aromatic polyesters obtained from diacids and dialcohols, and/or
the polyol $P_2$ is selected from:
  a saturated polyol having a number-average molecular weight ranging from 500 to 1500 g/mol, a hydroxyl value ranging from 100 mgKOH/g to 300 mgKOH/g, or
  a saturated polyol having a number-average molecular weight less than or equal to 300 g/mol.
Preferably, composition A comprises:
from 50 to 90% by weight of at least one polyol $P_1$ having a number-average molecular weight ranging from 290 to 1500 g/mol, a hydroxyl value ranging from 110 mgKOH/g to 600 mgKOH/g and an unsaturation level less than or equal to 150 Wijs
from 5 to 20% by weight of at least one filler,
up to 10% by weight of at least one material capable of adsorbing water (water-scavenger),
from 2 to 20% by weight of at least one amorphous polyester,
from 1 to 15% by weight of at least one saturated polyol $P_2$,
with respect to the total weight of composition A.

Preferably, in composition B:
the polyfunctional polyol $P_3$ is selected from the polypropylene glycols, the polyethylene glycols, and/or
the mixture of isocyanates comprises:
  from 60 to 90% by weight of 4,4'-diphenylmethylene diisocyanate,
  from 10 to 40% by weight of 2,4'-diphenylmethylene diisocyanate,
with respect to the total weight of the mixture of isocyanates.
Preferably, the prepolymer is obtained from:
from 10 to 40% by weight of at least one polyfunctional polyol $P_3$,
from 60 to 90% by weight of at least one mixture of isocyanates comprising at least 60% by weight of 4,4'-diphenylmethylene diisocyanate.
Preferably, the ratio of the number of NCO units in composition B to the number of OH units in composition A ranges from 1 to 1.5.
Preferably, the Brookfield viscosity measured at 23° C. of composition A ranges from 10,000 to 200,000 mPa·s, and the Brookfield viscosity measured at 23° C. of composition B ranges from 10 to 100,000 mPa·s.
According to an embodiment, the saturated polyol $P_2$ has a number-average molecular weight ranging from 500 to 1500 g/mol and a hydroxyl value ranging from 100 mgKOH/g to 300 mgKOH/g.
Preferably, the Brookfield viscosity measured at 23° C. of composition A ranges from 100,000 to 200,000 mPa·s, and the Brookfield viscosity measured at 23° C. of composition B ranges from 10,000 to 100,000 mPa·s.
According to another embodiment, the saturated polyol $P_2$ has a number-average molecular weight less than or equal to 300 g/mol.
Preferably, the Brookfield viscosity measured at 23° C. of composition A ranges from 10,000 to 30,000 mPa·s, and the Brookfield viscosity measured at 23° C. of composition B ranges from 10,000 to 50,000 mPa·s.
Another subject of the present invention relates to a ready-to-use kit comprising the adhesive composition according to the invention, compositions A and B being packaged in two separate compartments.

Another subject of the present invention relates to the use of the composition according to the invention or of the kit according to the invention for the manufacture of reverse osmosis filtration cartridges.

The invention also relates to a process for manufacturing membrane-type filtration cartridges comprising:
  a) supplying a membrane 2,
  b) folding the membrane obtained in step a),
  c) inserting a drainage fabric 3 between the two folds 2a and 2b of the membrane of step b) thus forming a section,
  d) supplying a collection tube onto which at least one first spacer 1 is partially wound,
  e) mixing compositions A and B of the adhesive composition 4 according to the invention,
  f) applying the adhesive composition 4 prepared in step e) to the inner face of a first spacer 1,
  g) depositing the section obtained at the end of step c) on the spacer coated with the adhesive composition 4, the closed side of the section being inserted along the collection tube,
  h) applying the adhesive composition 4 prepared in step e) to the upper face of the section inserted in step g),
  i) applying a second spacer 1' to the multilayer structure obtained in step h),
  j) optionally the repetition of steps f) to i), k) winding the multilayer structure obtained at the end of steps a) to j) comprising at least two spacers 1 and 1', at least one membrane 2 and at least one drainage fabric 3 around the collection tube, l) blocking the winding originating from step k) in order to obtain the filtration cartridge.

According to an embodiment, steps e) and f) of the process are automated.

The advantages of the present invention are as follows:
- the adhesive compositions according to the invention can be used equally well for manual application and for automated application,
- the adhesive composition according to the invention may not comprise catalyst,
- the adhesive composition according to the invention, after hardening, satisfies the tests for use in contact with food, in particular it can be used in filtration cartridges for the production of drinking water since, after hardening, it does not release any toxic substances.
- the adhesive composition according to the invention can be used in a filtration cartridge intended for the production of drinking water,
- the adhesive composition according to the invention can be used in applications for contact with food,
- the adhesive composition according to the invention has reduced foaming capacity, even reduced it to zero,
- the adhesive composition according to the invention has a high open time of the order of at least 20 minutes, thus allowing the construction of the multilayer,
- the adhesive composition according to the invention can be applied in the form of a bead which remains cohesive and does not flow, whilst correctly impregnating the filtering membrane,
- the two-component adhesive composition according to the invention is stable during storage, in particular the two-component adhesive composition does not degrade and does not lose its properties during prolonged storage of 2 weeks at 40° C.,
- the automated filter cartridge manufacturing process according to the invention makes it possible to reduce costs,
- the automated filter cartridge manufacturing process according to the invention makes it possible to optimize production yields, by reducing the number of defective products
- the filter cartridges according to the invention have a maximized filtration surface area thanks to the particular characteristics of the adhesive composition constituting the beads.

BRIEF DESCRIPTION OF THE FIGURES

FIG. 2A shows a spacer before application and FIG. 2B shows the spacer after application of the adhesive composition. FIG. 2C shows a cross-section of FIG. 2B, the bead of adhesive composition 4 is shown.

FIG. 3 shows certain steps of manufacture of a filtration cartridge according to the invention.

FIG. 3A shows a spacer to which the adhesive composition 4 according to the invention is applied.

FIG. 3B shows the multilayer structure obtained by applying a section comprising the folds 2a and 2b of the membrane 2 and a drainage fabric 3 to the spacer 1 coated with the adhesive composition 4.

FIG. 3C shows the multilayer structure of FIG. 3B to which the adhesive composition 4 according to the invention is applied.

FIG. 3D illustrates the step during which a second spacer 1' is applied to the multilayer structure obtained in FIG. 3C.

FIG. 3E illustrates the step of winding of the multilayer structure produced by the successive layers: spacer 1, fold of the membrane 2b, drainage fabric 3, fold of the membrane 2a and second spacer 1'.

FIG. 4 shows an embodiment in which a second membrane 2' and a second drainage fabric 3' are added.

FIG. 4A shows the multilayer structure of FIG. 3D to which an adhesive composition 4 according to the invention is applied.

FIG. 4B shows the multilayer structure obtained by applying a second section comprising the folds 2'a and 2'b of the second membrane 2' and a second drainage fabric 3' to the spacer 1' coated with the adhesive composition 4.

FIG. 4C illustrates the application of the adhesive composition 4 according to the invention to the multilayer structure obtained in FIG. 4B.

FIG. 4D shows a step during which a third spacer 1" is applied to the multilayer structure obtained in FIG. 4C.

DETAILED DESCRIPTION OF THE INVENTION

Figure 1A:
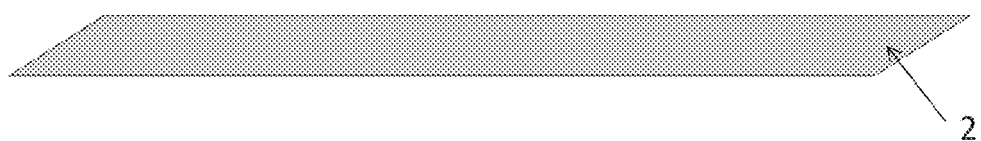
FIGS. 1A, 1B and 1C show a membrane 2, a membrane folded in two and a section comprising the membrane 2 and a drainage fabric 3 respectively.

The present invention relates to a polyurethane-based two-component adhesive composition comprising:
- a composition A, called resin composition A, comprising:
  - at least one unsaturated polyol $P_1$ having a number-average molecular weight ranging from 290 to 1500 g/mol, a hydroxyl value ranging from 100 mgKOH/g to 600 mgKOH/g and an unsaturation level less than or equal to 150 Wijs,
  - from 5 to 20% by weight of at least one filler, with respect to the total weight of composition A,
  - at least one amorphous polyester,
  - at least one saturated polyol $P_2$,
- a composition B, called hardener, comprising at least one prepolymer with NCO terminations, obtained from:
  - at least one polyfunctional polyol $P_3$, and
  - at least one mixture of isocyanates comprising at least 60% by weight of 4,4'-diphenylmethylene diisocyanate, with respect to the total weight of the mixture of isocyanates.

Resin Composition A

Polyol $P_1$

The resin composition A comprises at least one unsaturated polyol $P_1$ having a number-average molecular weight ranging from 290 to 1500 g/mol, a hydroxyl value ranging from 100 mgKOH/g to 600 mgKOH/g and an unsaturation level less than or equal to 150 Wijs, at least one filler, at least one amorphous polyester and at least one saturated polyol $P_2$.

By "unsaturated polyol" within the meaning of the present invention, is meant a polyol having a non-zero unsaturation level.

The unsaturation level can be measured by determining the iodine value. In fact, the iodine value of a lipid is the weight of diiodine ($I_2$), expressed in grams, capable of binding to the unsaturations, the double bonds in general, fatty acids, measured in 100 g of fat. The iodine value does not have a unit per se. Nevertheless, in the present invention, the unsaturation level is determined by the Wijs method and is expressed in Wijs units. The Wijs method makes it possible to determine the number of double bonds in a fatty acid by experimentation. This method is applicable to all types of compounds.

The number-average molecular weight can be measured by the standard methods well known to a person skilled in the art, for example by steric exclusion chromatography.

The hydroxyl value IOH is an experimental variable defined as the weight of KOH, expressed in mg, necessary to neutralize 1 g of polymer. The hydroxyl value IOH can be measured by the standard methods well known to a person skilled in the art, for example according to the standard NF T 52-112.

Preferably, the polyol $P_1$ has an OH functionality ranging from 2.2 to 3.5, preferably from 2.5 to 3.2, even more preferably from 2.8 to 3.

Within the meaning of the present invention, by OH functionality is meant the ratio of the number of moles of OH functions to the number of moles of polyol. The OH functionality can be calculated according to the formula below:

$$F = M \times IOH/56100$$

In the formula above, F represents the OH functionality, M represents the number-average molecular weight in g/mol and IOH represents the hydroxyl value in mgKOH/g.

The polyol $P_1$ can be of vegetable or petroleum origin.

Preferably, said polyol has a number-average molecular weight ranging from 290 to 1500 g/mol, preferably from 500 to 1300 g/mol, even more preferably from 900 to 1100 g/mol.

Preferably, said polyol has a hydroxyl value ranging from 100 mgKOH/g to 600 mgKOH/g, preferably from 120 to 300 mgKOH/g, even more preferably from 150 to 200 mgKOH/g.

Preferably, said polyol has an unsaturation level greater than 0 and less than or equal to 150 Wijs, preferably less than or equal to 125 Wijs, even more preferably less than or equal to 100 Wijs.

Preferably, said polyol $P_1$ is selected from the polyester polyols, the polyether-polyols, more preferentially from the polyester polyols.

Preferably, said polyol is selected from the unsaturated triglycerides functionalized by OH functions, preferably having an OH functionality ranging from 2.5 to 3.

Preferably, the polyol $P_1$ is present in the form of a mixture of polyols. According to an embodiment, the mixture of polyols on average has a number-average molecular weight M ranging from 290 g/mol to 1500 g/mol, a hydroxyl value ranging from 100 mgKOH/g to 600 mgKOH/g and an unsaturation level less than or equal to 150 Wijs.

Preferably, said polyol $P_1$ is castor oil.

According to an embodiment of the invention, the polyol $P_1$ or the mixture of polyols represents from 50 to 90% by weight, preferably from 60 to 85% by weight, even more preferably from 65 to 80% by weight, of the total weight of resin composition A.

Amorphous Polyester

Within the meaning of the present invention, by amorphous polyester is meant a polyester which is neither crystalline, nor semi-crystalline but a polymer constituted by disordered macromolecular chains arranged without any rules, in a random manner. They can be refolded, entangled. The amorphous nature of the polyester can be determined by different methods well known to a person skilled in the art, such as by differential scanning calorimetry" or "DSC", by density measurements, by X-ray diffraction, by polarizing optical microscopy, by transmission electron microscopy, by solid state NMR or by vibration spectroscopy.

Preferably, the amorphous polyester has a number-average molecular weight ranging from 700 to 2000 g/mol, preferably from 900 to 1500 g/mol.

Preferably, the amorphous polyester is of petroleum origin and is obtained from diacids and from aliphatic and/or cycloaliphatic and/or aromatic dialcohols.

Preferably, the amorphous polyester has an OH functionality ranging from 1.9 to 2.1, preferably an OH functionality of approximately 2.

Preferably, the amorphous polyester is a polyester polyol having an OH functionality ranging from 1.9 to 2.1, preferably an OH functionality of approximately 2. Even more preferably, the amorphous polyester polyol has a hydroxyl value ranging from 50 mgKOH/g to 150 mgKOH/g and preferably from 70 mgKOH/g to 120 mgKOH/g.

Preferably, the amorphous polyester represents from 2 to 20% by weight, preferably from 5 to 15% by weight of the total weight of resin composition A.

Filler

Preferably, the filler has an average particle size ranging from 1 to 10 µm, preferably from 1.5 to 7 µm, even more preferably from 2 to 5 µm.

The average particle size of filler can be measured by all methods well known to a person skilled in the art, for example by laser diffraction.

Preferably, the filler is a mineral filler, preferably selected from calcium carbonate, magnesium carbonate, sand, alumina, hydrated alumina, magnesium silicate, aluminium silicate, sodium silicate, potassium silicate, chalk, mica, talc, barium sulphate, kaolin-type clays and silica.

Preferably, the filler or fillers represent from 5 to 20% by weight, preferably from 7 to 15% by weight of the total weight of resin composition A.

Polyol $P_2$

The saturated polyol $P_2$ can be selected from:
- a saturated polyol having a number-average molecular weight ranging from 500 to 1500 g/mol, preferably from 700 to 1300 g/mol, and a hydroxyl value ranging from 100 to 350 mgKOH/g, preferably from 150 to 250 mgKOH/g, or
- a saturated polyol having a number-average molecular weight less than or equal to 300 g/mol, preferably less than or equal to 250 g/mol.

Preferably, the saturated polyol $P_2$ represents from 1 to 15% by weight, preferably from 3 to 10% by weight, of the total weight of resin composition A.

Material Capable of Adsorbing Water

Preferably, resin composition A also comprises at least one material capable of adsorbing water ("a water-scavenger"). The ability of a material to absorb water can be evaluated qualitatively by checking manually that there is exothermicity when the material absorbs or captures humidity, for example when the material is grasped in the hand, the skin is warmed. Preferably, said material is a porous material. Preferably, said porous material has a pore size ranging from 3 to 5 Angstrom, preferably from 3 to 4 Angstrom, preferably approximately 3 Angstrom.

A person skilled in the art knows numerous materials capable of adsorbing water. Zeolite or calcium oxide may in particular be mentioned.

Preferably, the material capable of adsorbing water is an inorganic material.

Preferably, the material capable of adsorbing water is zeolite, preferably synthetic zeolite.

The addition of the material capable of adsorbing water makes it possible in particular to eliminate the foaming phenomenon. Indeed, the NCO functions react easily with water, by a reaction forming carbon dioxide. Said material adsorbs (traps) the humidity present in the air and therefore prevents any reaction between the NCO functions present in hardener composition B and the water; thus the NCO functions react suitably with the OH functions of resin composition A and not with the water present in particular in the air.

According to an embodiment of the invention, the material capable of adsorbing water represents up to 10% by weight, preferably from 2 to 7% by weight, of the total weight of resin composition A.

Resin Composition A

According to the present invention, the viscosity is measured using a Brookfield viscosimeter, according to the standard ISO 2555.

According to an embodiment of the invention, the Brookfield viscosity measured at 23° C. of resin composition A ranges from 10,000 to 200,000 mPa·s.

The viscosity of resin composition A is measured at 23° C. using a Brookfield viscosimeter with a No. 7 needle and at a speed of 20 rpm.

Preferably, the Brookfield viscosity measured at 23° C. of resin composition A is adjusted as a function of the method of utilization of the two-component adhesive composition. Indeed, for utilization in a process comprising manual mixing of the adhesive composition, the Brookfield viscosity measured at 23° C. of resin composition A preferably ranges from 10,000 to 30,000 mPa·s. And for utilization in a process comprising automated mixing, the Brookfield viscosity measured at 23° C. of resin composition A preferably ranges from 100,000 to 200,000 mPa·s.

The viscosity of resin composition A can be adjusted by appropriate selection of the saturated polyol $P_2$.

According to a first embodiment of the invention, for automated mixing of the two-component adhesive composition, the saturated polyol $P_2$ is selected from the saturated polyols having a number-average molecular weight ranging from 500 to 1,500 g/mol, preferably from 700 to 1,300 g/mol, and a hydroxyl value ranging from 100 to 350 mgKOH/g, preferably from 150 to 250 mgKOH/g.

According to this variant, preferably, the saturated polyol $P_2$ has an OH functionality ranging from 2.2 to 3.5, preferably ranging from 2.5 to 3.2, even more preferably ranging from 2.8 to 3.

According to this variant, preferably, the saturated polyol $P_2$ is selected from the polyester polyols, even more preferably from the triglycerides of fatty acids functionalized by OH, the OH functionality preferably ranging from 2.5 to 3.

Preferably, the saturated polyol is hydrogenated castor oil.

According to another embodiment, for manual mixing of the two-component adhesive composition, the saturated polyol $P_2$ is selected from the saturated polyols having a number-average molecular weight less than or equal to 300 g/mol, even more preferably less than or equal to 250 g/mol.

According to this variant, preferably, the saturated polyol is selected from diethylene glycol, dipropylene glycol, ethylene glycol, 1,2-propylene glycol, 1,3-propylene glycol, 1,4-butylene glycol, 2,3-butylene glycol, 1,6-hexane diol, 1,8-octane diol, neopentyl glycol, 1,4-bishydroxymethyl cyclohexane, glycerine, trimethylolpropane, trimethylolethane, 1,2,6-hexane triol, 1,2,4-butane triol, pentaerythritol, quinitol, mannitol, sorbitol, formitol, α-methyl-glucoside 2-methyl-1,3-propane diol, triethylene glycol, tetraethylene glycol, dibutylene glycol, triethylene glycol, tripropylene glycol, tetraethylene glycol, tetrapropylene glycol, trimethylene glycol, tetramethylene glycol, and 1,4-cyclohexanedimethanol (1,4-bis-hydroxymethylcyclohexane).

Irrespective of the process of utilization of the adhesive composition, preferably, resin composition A comprises:
- from 50 to 90% by weight, preferably from 60 to 85% by weight, even more preferably from 65 to 80% by weight of at least one polyol $P_1$ as defined above,
- from 5 to 20% by weight, preferably from 7 to 15% by weight, of at least one filler,
- from 2 to 20% by weight, preferably from 5 to 15% by weight, of at least one amorphous polyester,
- from 1 to 15% by weight, preferably from 3 to 10% by weight, of at least one saturated polyol $P_2$ as defined above,
- up to 10% by weight, preferably from 2 to 7% by weight, of at least one material capable of adsorbing water, with respect to the total weight of resin composition A.

Preferably, resin composition A essentially consists of:
- from 50 to 90% by weight, preferably from 60 to 85% by weight, even more preferably from 65 to 80% by weight, of at least one polyol $P_1$ as defined above,
- from 5 to 20% by weight, preferably from 7 to 15% by weight, of at least one filler,
- from 2 to 20% by weight, preferably from 5 to 15% by weight, of at least one amorphous polyester,
- from 1 to 15% by weight, preferably from 3 to 10% by weight, of at least one saturated polyol $P_2$ as defined above,
- up to 10% by weight, preferably from 2 to 7% by weight, of at least one material capable of adsorbing water, with respect to the total weight of resin composition A.

Hardener Composition B

Hardener composition B comprises at least one prepolymer with NCO terminations, obtained from:
- at least one polyfunctional polyol $P_3$, and
- at least one mixture of isocyanates comprising at least 60% by weight of 4,4'-diphenylmethylene diisocyanate, with respect to the total weight of the mixture of isocyanates.

Polyfunctional Polyol $P_3$

Preferably, the polyfunctional polyol $P_3$ is selected from the polypropylene glycols, polyethylene glycol, polybutylene glycols etc.

Mixture of Isocyanates

The mixture of isocyanates can comprise monomers and prepolymers functionalized by NCO functions.

Within the meaning of the present invention, by "mixture of isocyanates comprising at least 60% by weight of 4,4'-diphenylmethylene diisocyanate", is meant a mixture which comprises at least 60% by weight 4,4'-diphenylmethylene diisocyanate in the form of monomers, i.e. in the non-polymerized form.

Preferably, the mixture of isocyanates also comprises at least one other isocyanate selected from the aliphatic, alicyclic and aromatic isocyanates.

Preferably, the mixture of isocyanates also comprises at least one other isocyanate selected from 2,2'-diphenylmethylene diisocyanate, 4,4'-diphenylmethylene diisocyanate, 2,6-toluene diisocyanate, m-xylylene diisocyanate, 2,4'-diphenylmethylene diisocyanate, 2,4'-dibenzyl diisocyanate, 2,4-toluene diisocyanate, methylene bis(4-cyclohexylisocyanate), isophorone diisocyanate, hexamethylene diisocyanate.

Preferably, the mixture of isocyanates essentially consists of two different isocyanates.

Preferably, the mixture of isocyanates comprises:
from 60 to 90% by weight, preferably from 65 to 85% by weight, of 4,4'-diphenylmethylene diisocyanate,
from 10 to 40% by weight, preferably from 15 to 35% by weight, of at least one other isocyanate selected from the aliphatic, alicyclic and aromatic isocyanates,
with respect to the total weight of the mixture of isocyanates.

Preferably, the mixture of isocyanates comprises:
from 60 to 90% by weight, preferably from 65 to 85% by weight, of 4,4'-diphenylmethylene diisocyanate,
from 10 to 40% by weight, preferably from 15 to 35% by weight, of 2,4'-diphenylmethylene diisocyanate,
with respect to the total weight of the mixture of isocyanates.

Preferably, the mixture of isocyanates essentially consists of:
60 to 90% by weight, preferably 65 to 85% by weight, of 4,4'-diphenylmethylene diisocyanate,
10 to 40% by weight, preferably 15 to 35% by weight, of 2,4'-diphenylmethylene diisocyanate,
with respect to the total weight of the mixture of isocyanates.

Preferably, the prepolymer with NCO terminations has a number-average molecular weight ranging from 500 to 3,000 g/mol, preferably ranging from 900 to 2,500 g/mol.

Preferably, the prepolymer with NCO terminations has an NCO functionality ranging from 2 to 4, preferably from 2.5 to 3.5.

Within the meaning of the present invention, by NCO functionality is meant the ratio of the number of moles of NCO functions to the number of moles of prepolymer. The NCO functionality can be measured according to a method described in the experimental part. The method of assay of the free NCO functions includes the assay of the functions borne by the diisocyanate monomer and of the functions borne at the end of the prepolymer chain.

Preferably, the prepolymer with NCO terminations is obtained by reacting:
from 10 to 40% by weight, preferably from 15 to 30% by weight, of polyfunctional polyol(s) $P_3$, and
from 60 to 90% by weight, preferably from 70 to 85% by weight, even more preferably from 75 to 80% by weight of the mixture of isocyanates,
with respect to the total weight of the prepolymer.

Preferably, the mass percentage of NCO isocyanate functions with respect to the weight of prepolymer in hardener composition B ranges from 10 to 30%, preferably 15 to 25% by weight.

Other Components

Preferably, hardener composition B also comprises a few ppm by mass of phosphoric acid for stabilizing the prepolymer. When it is present, the phosphoric acid represents no more than 0.1% by weight of the total weight of hardener composition B.

Preferably, hardener composition B also comprises one or more additives selected from the materials capable of adsorbing water, fillers, organic and/or inorganic pigments or colorants, rheology modifiers.

Preferably, the filler or fillers are identical to those of resin composition A.

Preferably, the material capable of adsorbing water is identical to that which can be used in resin composition A.

Hardener Composition B

The viscosity of hardener composition B is measured with a Brookfield viscosimeter according to the standard ISO 2555.

Preferably, the Brookfield viscosity measured at 23° C. of hardener composition B ranges from 10,000 to 100,000 mPa·s.

The viscosity of the hardener is measured at 23° C. using a Brookfield viscosimeter with a No. 6 needle and at a speed of 20 rpm.

As for resin composition A, the viscosity at 23° C. of hardener composition B can be adjusted depending on the method of preparation of the two-component adhesive composition. Indeed, for manual mixing of the two-component adhesive composition, the viscosity at 23° C. of hardener composition B preferably ranges from 10,000 to 50,000 mPa·s, preferably from 20,000 to 40,000 mPa·s. And for automated mixing of the two-component adhesive composition, the viscosity at 23° C. of hardener composition B preferably ranges from 10,000 to 100,000 mPa·s, preferably from 25,000 to 75,000 mPa·s.

Irrespective of the method of utilization of the adhesive composition, preferably, hardener composition B essentially consists of a prepolymer obtained from:
at least one polyfunctional polyol $P_3$, and
at least one mixture of isocyanates comprising at least 60% by weight of 4,4'-diphenylmethylene diisocyanate, with respect to the total weight of the mixture of isocyanates.

Preferably, hardener composition B essentially consists of at least one prepolymer obtained from:
from 10 to 40% by weight, preferably from 15 to 30% by weight, of polyfunctional polyol(s) $P_3$, and
from 60 to 90% by weight, preferably from 70 to 85% by weight, even more preferably from 75 to 80% by weight of the mixture of isocyanates,
with respect to the total weight of the prepolymer.

Two-Component Adhesive

Preferably, the ratio of the number of NCO units in hardener composition B to the number of OH units in resin composition A ($NCO_B/OH_A$) ranges from 1 to 1.5 and preferentially from 1 to 1.2.

The respective proportions of compositions A and compositions B are adjusted in order to obtain the desired $NCO_B/OH_A$ ratio.

Preferably, the ratio by volume: resin composition A/hardener composition B, in the two-component adhesive composition ranges from 2/1 to 1/1.

Preferably, the viscosity of the adhesive composition after mixing compositions A and B ranges from 10,000 to 200,000 mPa·s, preferably from 14,000 to 150,000 mPa·s.

The viscosity can vary depending on the method of utilization of the adhesive composition. Indeed, for manual mixing of the adhesive composition, the viscosity preferably ranges from 10,000 to 80,000 mPa·s, even more preferably from 14,000 to 65,000 mPa·s. For automated mixing of the adhesive composition, the viscosity preferably ranges from 100,000 to 200,000 mPa·s, preferably from 110,000 to 150,000 mPa·s.

The viscosity of the two-component adhesive composition is measured at 23° C. using a Brookfield viscosimeter with a No. 6 needle and at a speed of 20 rpm.

The adhesive composition according to the invention can comprise a metallic salt-type catalyst (metals of the following types: tin, bismuth, titanium, nickel, copper, zirconium, etc.) or of amine type (primary or secondary amines, diamines, triamines, etc.) but preferentially the adhesive composition according to the invention comprises no catalyst, in particular neither resin composition A, nor hardener composition B comprises any catalyst.

The adhesive composition according to the invention is found in the form of two compositions separated for storage. The resin composition A forms a first part of the adhesive composition and hardener composition B forms the second part of the adhesive composition.

Process for Preparing the Adhesive Composition According to the Invention

The present invention also relates to a process for preparing the adhesive composition according to the invention.

The process for preparing resin composition A and hardener composition B respectively comprises mixing the constituents of resin composition A and of hardener composition B respectively. Preferably, the process of preparation comprises at least one step of conditioning the constituents at a temperature of the order of 25° C. Preferably, the preparation process comprises at least one step of placing under vacuum, preferably at a pressure of less than $0.9 \times 10^5$ Pa.

Resin composition A can be prepared according to the protocol described in the experimental part (for compositions 1 or 2).

Hardener composition B can be prepared according to the protocol described in the experimental part (for compositions 1 or 2).

The utilization of the two-component adhesive composition comprises mixing resin composition A with hardener composition B. The two compositions A and B of the adhesive composition are intended to be mixed in an extemporaneous mixing process, when said adhesive composition is used to achieve a bonding.

The mixing of the two compositions A and B of the two-component adhesive composition can be carried out by manual mixing or by automated mixing (pumping and dosing machine).

The open time OT of an adhesive composition is defined as the time not to be exceeded before assembling the elements to be bonded. Outside the open time, the sought properties are no longer ensured, in particular the adhesive composition is no longer sufficiently fluid (hardening too advanced) to ensure satisfactory wetting of the element to be laminated.

This parameter is influenced by the components of the adhesive, by the ambient climatic conditions (humidity, temperature) but also depends for example on the thickness of the adhesive joint and of the nature of the elements to be assembled.

Ready-to-use Kit

The present invention also relates to a ready-to-use kit, comprising resin composition A as defined above on the one hand and hardener composition B as defined above on the other hand, packaged in two separate compartments.

Indeed, the adhesive composition according to the invention can be found in a two-component form, for example within a ready-to-use kit, comprising resin composition A on the one hand in one compartment or cartridge and hardener composition B on the other hand in a second compartment or cartridge, within for example a dual cartridge in proportions suitable for the direct mixing of the two components According to an embodiment of the invention, the kit also comprises one or more means allowing the mixing of the two compositions A and B. Preferably, the mixing means are selected from static mixers with a diameter suitable for the quantities used.

The adhesive composition and the kit according to the invention can be used for numerous applications, in particular the manufacture of articles intended for a use involving contact with foods.

According to an embodiment of the invention, the ready-to-use kit also comprises one or more constituents selected from a collection tube, a spacer, a drainage fabric and a filtering membrane. According to this variant, the kit makes it possible to manufacture a filtration cartridge.

According to an embodiment of the invention, the membrane 2 is found in a form that is folded in two, forming two folds 2a and 2b (see FIG. 1A).

Figure 1B:
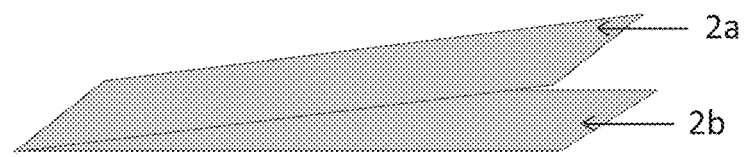
Figure 1C:
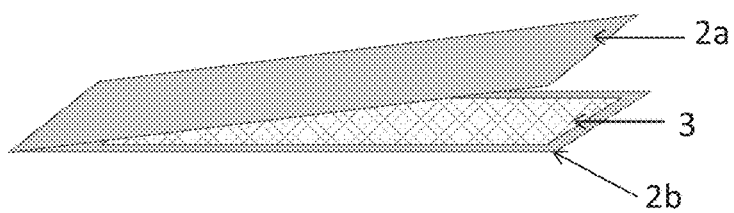

According to an embodiment of the invention, the ready-to-use kit also comprises at least one section comprising a membrane folded in two and a drainage fabric 3 inserted between the two folds 2a and 2b of the filtering membrane (see FIG. 1B).

The raw water is distributed over the surface of the membrane via the drainage fabric, the filtrate is guided by the spacer up to the collection tube.

The filtration cartridge which can be used in the present invention can comprise all types of membranes, spacers and drainage fabrics well known to a person skilled in the art for use in processes of filtration on a membrane by a reverse osmosis process.

In particular, the filtering membrane 2 can be composed of the following three successive layers:
 a polyamide layer, preferably of a thickness less than or equal to 5 μm, more particularly less than or equal to 2 μm,
 a polysulphone layer, preferably of a thickness ranging from 30 to 80 μm, more particularly of the order of 50 μm,
 a polyester layer, preferably of a thickness ranging from 120 to 200 μm, more particularly of the order of 150 μm.

The polysulphone layer corresponds to the semi-permeable, active part of the membrane.

Preferably, the drainage fabric and the spacer are selected from woven or non-woven materials, meshes, grids, preferably the spacer and/or the drainage fabric are made of polypropylene or polyethylene.

The collection tube can be selected from any type of tube used in a standard fashion in the filtration cartridges. Preferably, the collection tube is made of polypropylene or polyethylene.

Use of the Adhesive Composition According to the Invention

The present invention also relates to the use of the two-component adhesive composition according to the invention for the manufacture of a filtration cartridge by reverse osmosis.

According to an embodiment of the invention, the filtration cartridge comprises:
 a collection tube,
 at least two spacers,
 at least one membrane, and
 at least one drainage fabric.

The constituents listed above are bonded to each other using the adhesive composition according to the invention.

Figure 2:
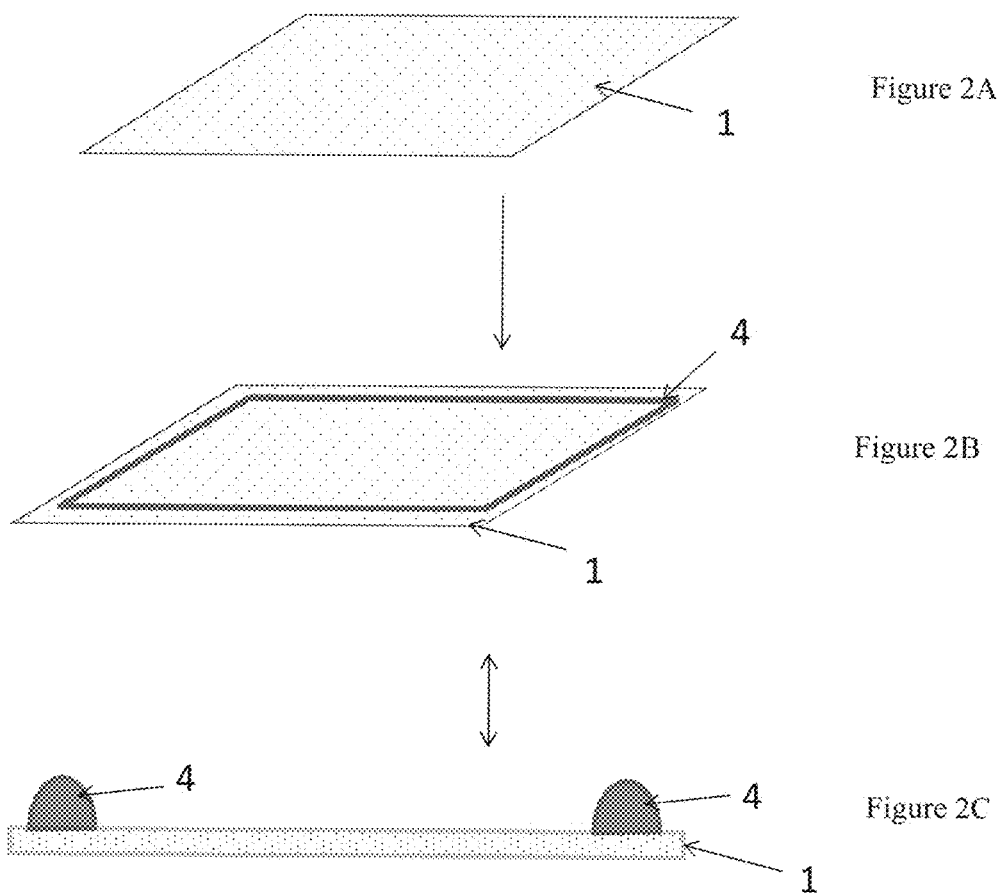
FIG. 2 shows the application of the adhesive composition according to the invention.

FIG. 2 shows a spacer (FIG. 2A) to which an adhesive composition 4 according to the invention is applied (FIG. 2B). The composition is preferably applied in the form of a bead. In fact, this form of application allows better impregnation of the membrane. FIG. 2C corresponds to a cross-sectional view of the filtering assembly of FIG. 2B (the spacer 1 has been shown with a certain thickness for better visibility). The bead of adhesive is visible and is represented by the two elements 4 of FIG. 2C.

The adhesive composition according to the invention makes it possible in particular to have a good resistance of the bead in order to allow good impregnation of the membrane at the time of winding of the cartridge, i.e. at the time when a stress is applied to the bead of adhesive composition.

According to a preferred embodiment shown in FIG. 2B, the adhesive composition is applied to the periphery of the spacer. Nevertheless, other patterns of application of the adhesive composition are possible.

Filtration Cartridge

The present invention also relates to a cartridge for filtration by "membrane"-type reverse osmosis in which the filtering assembly or the filtering assemblies are bonded using the two-component adhesive composition according to the present invention.

The filtration cartridge according to the present invention comprises at least two spacers, at least one filtering membrane and at least one drainage fabric, the adhesive composition according to the invention being applied to at least one face selected from the spacer and the membrane.

Preferably, the membrane is found in a form that is folded in two, with a drainage fabric inserted between the two folds 2a and 2b of the membrane.

Preferably, the adhesive composition according to the invention is applied in the form of a bead of adhesive onto the periphery of the spacer (see FIG. 2B and FIG. 2C), and/or onto the periphery of one of the two folds of membrane, for example to the fold 2a in FIG. 3C. Even more preferably, the adhesive composition is applied to the membrane in a U-shape, the open side of the U being situated along the crease of the membrane. Similarly, according to a preferred embodiment, the adhesive composition is applied to the spacer in a U-shape, the open side of the U being situated on the side of the spacer intended to be superimposed on the crease of the membrane.

FIG. 3 shows different steps of an embodiment of the manufacture of a filtration cartridge according to the invention, the collection tube is not shown.

A step not shown in FIG. 3 is the step during which the spacer is partially wound around the collection tube, for example by making 1 to 2 turns around the tube. The spacer can be fixed to the tube using the adhesive composition according to the invention, for example by applying a circle of adhesive to the two ends of the collection tube, before partial winding of the spacer.

FIG. 3A shows a spacer to which the adhesive composition 4 according to the invention is applied. According to an embodiment that is not shown, the spacer can then be partially wound a second time, of the order of 1 to 2 turns, around the collection tube. This optional step makes it possible to wind around the tube a spacer coated with the adhesive composition according to the invention.

FIG. 3B shows the multilayer structure obtained by applying a section comprising the folds 2a and 2b of the membrane 2 and a drainage fabric 3 to the spacer 1 coated with the adhesive composition 4. Under the effect of crushing, the bead of adhesive 4 infiltrates the open structure of the spacer and is distributed over its two faces.

FIG. 3C shows the multilayer structure of FIG. 3B to which the adhesive composition 4 according to the invention is applied.

FIG. 3D illustrates the step during which a second spacer 1' is applied to the multilayer structure obtained in FIG. 3C.

FIG. 3E illustrates the step of winding of the multilayer structure produced by the successive layers: spacer 1, fold of the membrane 2b, drainage fabric 3, fold of the membrane 2a and second spacer 1'. For greater simplicity, the layers are not shown with a certain thickness in FIG. 3E. According to an embodiment, the spacers 1 and 1' form one sheet and are therefore connected at an edge.

The cartridge can be used after hardening of the adhesive composition according to the invention.

The filtration cartridge according to the invention can moreover comprise one or more additional filtration membranes.

FIG. 4 illustrates an embodiment of the invention in which the filtration cartridge comprises a second filtration membrane 2'.

FIG. 4A shows the multilayer structure of FIG. 3D to which an adhesive composition 4 according to the invention is applied.

FIG. 4B shows the multilayer structure obtained by applying a second section comprising the folds 2'a and 2'b of the second membrane 2' and a second drainage fabric 3' to the spacer 1' coated with the adhesive composition 4.

FIG. 4C illustrates the application of the adhesive composition 4 according to the invention to the multilayer structure obtained in FIG. 4B.

FIG. 4D shows a step during which a third spacer 1" is applied to the multilayer structure obtained in FIG. 4C.

The filtration cartridge is then obtained by winding of the multilayer structure of filtering assemblies and hardening of the adhesive composition.

The winding of the multilayer structure causes the application a shearing force to the adhesive composition, which makes it possible to impregnate the membrane 2 (and membrane 2' leading to the folds 2'a and 2'b when a second membrane is used) and the spacer 1 (and spacers 1' and 1") and to ensure the sealing of the filtration cartridge.

The adhesive composition can be applied either to the spacer (FIG. 3A) or to the membrane (FIG. 3C). The adhesive composition is not applied to the drainage fabric. As a result, the structure of the spacer is preferably less open than the structure of the drainage fabric in order to keep the adhesive composition on the surface of the spacer. The open structure of the drainage fabric makes it possible to limit flow losses of feed and to increase the interstitial "free" volume with respect to the spacer.

Preferably, the characteristics of the constituents of the filtration cartridge are as described above for the ready-to-use kit.

Figure 5:
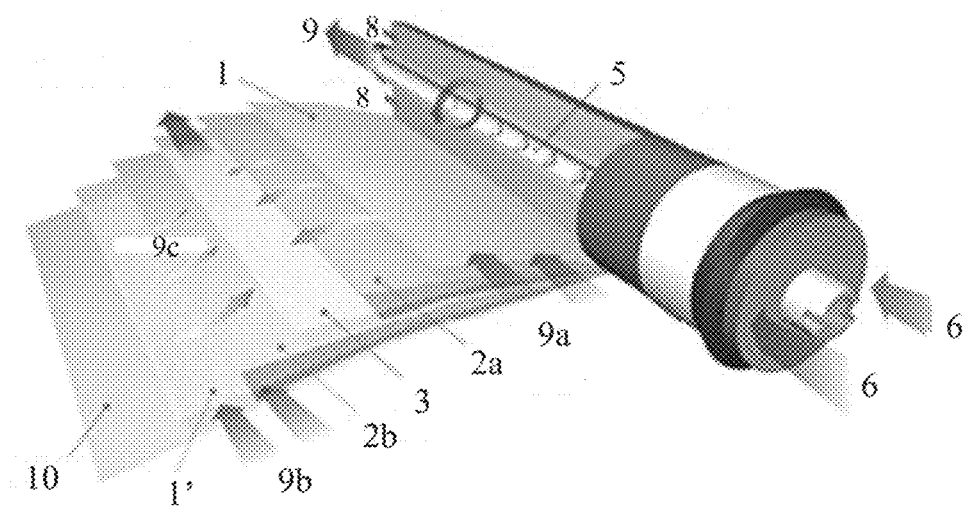
FIG. 5 shows a filtration cartridge in exploded view, making it possible to observe the superimposition of the layers and the operating mode.

FIG. 5 shows a filtration cartridge according to the invention, the multilayer structure produced by the layers being exploded in order to allow their visualization.

The feed water enters via the inlet 6 of the cartridge, the permeate is collected in the drainage tube 5 and leaves via the outlet 9. The outlet 8 represents the residue outlets.

The arrows 9a, 9b and 9c represent the flow of the permeate in the cartridge.

The cartridge shown in FIG. 5 comprises a filtering membrane 2 comprising two folds 2a and 2b, two spacers 1 and 1' and a drainage fabric 3. The adhesive composition according to the invention is not shown in this figure.

The cartridge comprises an outer casing 10.

Process for Manufacturing the Filtration Cartridge According to the Invention

The process for manufacturing the filtration cartridges comprises the following steps:

a) supplying a membrane 2, b) folding the membrane obtained in step a), c) inserting a drainage fabric 3 between the two folds 2a and 2b of the membrane of step b) thus forming a section, d) supplying a collection tube onto which at least one first spacer 1 is partially wound, e) mixing compositions A and B of the adhesive composition according to the invention, f) applying the adhesive composition 4 prepared in step e) to the inner face of a first spacer 1, g) depositing the section obtained at the end of step c) on the spacer coated with the adhesive composition 4, the closed side of the section being inserted along the collection tube, h) applying the adhesive composition prepared in step e) to the upper face of the section inserted in step g), i) applying a second spacer 1' to the multilayer structure obtained in step h), j) optionally the repetition of steps f) to i), k) winding the multilayer structure obtained at the end of steps a) to j) comprising at least two spacers 1 and 1', at least one membrane 2 and at least one drainage fabric 3 around the collection tube, l) blocking the winding originating from step k) in order to obtain the filtration cartridge.

According to an embodiment of the invention, the filtering membrane 2 is composed of the following three successive layers:

- a polyamide layer, preferably of a thickness less than or equal to 5 µm, more particularly less than or equal to 2 µm,
- a polysulphone layer, preferably of a thickness ranging from 30 to 80 µm, more particularly of the order of 50 µm,
- a polyester layer, preferably of a thickness ranging from 120 to 200 µm, more particularly of the order of 150 µm.

The polysulphone layer represents the semi-permeable, active part of the membrane.

The filtering membrane is folded in two, the crease being situated approximately in the middle of the membrane, two folds 2a and 2b are obtained.

Preferably, the surfaces inside the crease are the polyamide-type layers.

The drainage fabric 3 is inserted between the two folds 2a and 2b of the filtering membrane. The dimensions of the drainage fabric 3 are therefore substantially identical to those of the folds 2a and 2b of membrane obtained after folding.

A section comprising the membrane 2 folded in two and the drainage fabric 3 inserted in the middle is obtained.

In parallel, a spacer 1 is partially wound around a collection tube. For example, the spacer 1 is wound in order to make of the order of 1 to 2 turns around the collection tube. After partial winding around the collection tube, the remaining surface area of spacer 1 is at least equal to the surface area of a fold of the membrane.

The adhesive composition according to the invention is then applied to the spacer 1, on the inner surface of the partial winding of the spacer. Preferably, the adhesive composition 4 according to the invention is applied in a U-shape to the periphery of the spacer, the corresponding open side of the U along the collection tube. Preferably, the adhesive composition 4 is applied in the form of a bead during step f). Preferably, thanks to the cohesive structure of the adhesive composition according to the invention, the bead is maintained and retains its form in the absence of mechanical stress. The adhesive composition according to the invention has an optimum open time of at least 30 minutes for the filter cartridge manufacturing process.

The section is then deposited on the spacer 1 coated with the adhesive composition 4 according to the invention.

Then, the adhesive composition 4 according to the invention is applied to the section.

A second spacer 1' is applied to the section coated with the adhesive composition 4 according to the invention.

Then, either the multilayer structure obtained is wound around the collection tube, or a second section is deposited on the multilayer structure obtained.

FIGS. 3 and 4 illustrate certain steps of the process for manufacturing the filtration cartridge.

For the implementation of the process, the temperature preferably ranges from 15 to 40° C., preferably from 20 to 30° C., typically is of the order of 25° C.

Preferably, the humidity ranges from 30 to 90% relative humidity, preferably from 50 to 80%, typically of the order of 70% relative humidity.

According to an embodiment of the invention, steps e) and f) are carried out by an automated process.

Preferably, all the steps of the process for manufacturing filtration cartridges are automated.

Preferably, the pressure used during the manufacture of the filter cartridge by an automated process is comprised between 5 and 30 bar (between 5 and 30×10$^5$ Pa).

Automation of the steps of mixing and applying the adhesive composition makes it possible to use adhesive compositions having a much greater viscosity. Automation is possible thanks to the particular composition of the adhesive composition according to the invention. In fact, the adhesive compositions according to the prior art do not allow automated application.

Preferably, the automated process comprises the use of robotic arms for applying the adhesive. Preferably, the robot comprises from 3 to 5 axes and the flow rate of the adhesive is linked to the speed of the robot like an additional axis.

Preferably, the automated process comprises computerized means for controlling the parameters, in particular the parameters relating to the mixing of the two compositions A and B (ratio A/B for example), the viscosity of the adhesive composition, and the quantity of adhesive applied.

The automated process for manufacturing the cartridge allows better reproducibility, a higher manufacturing speed, and better manufacturing yields.

According to another embodiment, all the steps of manufacture of the filtration cartridges according to the present invention are implemented by a manual process.

In fact, as a function of the adjustment of its viscosity, the adhesive composition according to the invention is suitable for both a manual application and automated application.

EXAMPLES

Different two-component adhesive compositions have been prepared.

The following compounds were used:

for resin part A:
- castor oil: hydroxyl value IOH=162 mgKOH/g; OH functionality F=2.8; number-average molecular weight M=970 g/mol; unsaturation levels of 95 Wijs;
- Milicarb® OG chalk (available from OMYA): $CaCO_3$, diameter of 2.7 µm;
- Aerosil® R202 (available from Evonik): pyrogenated silica treated in order to be hydrophobic;
- Polyester Realkyd® XTR 10410 (available from Cray Valley): IOH=112 mgKOH/g; F=2; M=1000 g/mol;
- Thixatrol® ST (available from Elementis): hydrogenated castor oil; IOH=162 mgKOH/g; F=2.8;

Diethylene glycol: M=106.12 g/mol;

Siliporite® TMSA 1720 (available from CECA): synthetic zeolite, 3 Angstrom, sodium/potassium.

for hardener part B:

VORANOL® CP 450 (available from Dow Chemical): polypropylene glycol; F=3; IOH=380 mgKOH/g; M=450 g/mol;

VORANOL® 1010L (available from Dow Chemical): polypropylene glycol; F=2; IOH=112 mgKOH/g; M=1000 g/mol;

LUPRANAT® MIPI (available from Elastogran): monomeric mixture of approximately 50% by weight of 4,4'-diphenylmethylene diisocyanate (4,4'-MDI) and 50% by weight of 2,4'-diphenylmethylene diisocyanate (2,4'-MDI); mass percentage of NCO functions=33.5; M=250 g/mol; NCO functionality F'=2;

Suprasec® 5025 (available from Huntsman): mixture of approximately 50% by weight of 4,4'-MDI monomers and 50% by weight of polymers obtained from 4,4'-MDI; mass percentage of NCO functions=31; F'=2.7;

Suprasec® 2004 (available from Huntsman): mixture of approximately 70% by weight of 4,4'-MDI monomers and 30% by weight of 2,4'-MDI monomers; mass percentage of NCO functions=32.8; M=250 g/mol; F'=2;

Isonate® M143 (available from Dow Chemical): mixture of approximately 70% of 4,4'-MDI monomers and approximately 30% by weight of MDI carbodiimide; mass percentage of NCO=29; M=316 g/mol; F'=2.2.

Composition 1 According to the Invention

The composition 1 is prepared as follows:

resin part A:

Apply a set temperature of 25° C. in a Niemann-type mixer,

Load the castor oil intended to be incorporated,

Load the amorphous polyester Realkyd® XTR 10410 into the reactor,

Load the saturated polyol Thixatrol® ST,

Stir the reaction medium for 20 minutes at 25 rpm,

Place the mixer under maximum vacuum (pressure less than $0.9 \times 10^5$ Pa),

Apply a set temperature of 85° C.,

Maintain under maximum vacuum at 80-85° C. for approximately 1 h,

Cool the reaction medium to 30° C., check visually that the product contains no grains, Break the vacuum by injecting nitrogen, Introduce the Milicarb® OG filler into the mixer, Introduce the material capable of adsorbing water Siliporite®TMSA 1720, Stir at 25 rpm for 20 minutes, Maintain under vacuum for 30 minutes, Introduce the Aerosil® R202 filler to be introduced, Stir at 25 rpm for 1 hour, Break the vacuum by injecting nitrogen, Check the Brookfield viscosity at 23° C. (No. 7 needle, speed 20 rpm). The viscosity at 23° C. of resin part A is 172,000 mPa·s.

hardener part B:

Place the reactor under maximum vacuum (pressure less than $0.9 \times 10^5$ Pa) and maintain a set temperature of 25° C., Introduce the mixture of Suprasec® 2004 isocyanates into the reactor, Stir at 25 rpm, Introduce the Voranol® CP450 polyfunctional polyol, Heat the reaction mixture to a temperature of the order of 60-65° C., Maintain the reactor under maximum vacuum at 60-65° C. for approximately 1 hour 30 minutes, Break the vacuum by injecting nitrogen into the reactor, Check the mass percentage of NCO functions, if said percentage is not of the order of 19-20%, extend the reaction by 30 minutes, then re-check the mass percentage of NCO Check the Brookfield viscosity at 23° C. (No. 6 needle, speed 20 rpm) at 23° C. The viscosity at 23° C. of the resin part B is of the order of 52,000 mPa·s.

mixing the two parts A and B: resin part A and hardener part B are mixed by an automated process; the A/B ratio by mass is 100/55 and the A/B ratio by volume is 100/50; the NCO/OH ratio is of the order of 1.08. The Brookfield viscosity of the mixture obtained is of the order of 110,000-150,000 mPa·s.

Composition 2 According to the Invention

The composition 2 is prepared as follows:

resin part A:

Apply a set temperature of 25° C. in the reactor,

Load the castor oil intended to be incorporated,

Load the saturated polyol diethylene glycol,

Stir the reaction medium for 20 minutes at 25 rpm,

Place the reactor under maximum vacuum (pressure less than $0.9 \times 10^5$ Pa), Break the vacuum by injecting nitrogen, Load the amorphous polyester Realkyd® XTR 10410, Apply a set temperature of 85° C., Maintain under maximum vacuum at 80-85° C. for approximately 1 hour, Cool the reaction medium to 30° C., check visually that the product contains no grains, Break the vacuum by injecting nitrogen, Introduce the Milicarb® OG filler into the reactor, Introduce the material capable of adsorbing water, Siliporite® TMSA 1720, Stir at 25 rpm and maintain under vacuum for approximately 30 minutes, Introduce the Aerosil® R202 filler to be introduced, Stir at 25 rpm for 1 hour, Break the vacuum by injecting nitrogen, Check the Brookfield viscosity at 23° C. (No. 7 needle, speed 20 rpm). The viscosity at 23° C. of resin part A ranges from 15,000 to 30,000 mPa·s.

hardener part B:

Place the reactor under maximum vacuum (pressure less than $0.9 \times 10^5$ Pa) and maintain a set temperature of 25° C., Introduce the mixture of isocyanates Isonate® M143 into the reactor, Stir at 25 rpm, Introduce the Voranol® CP450 polyfunctional polyol, Introduce 85% phosphoric acid, Heat the reaction mixture to a temperature of the order of 60° C., Maintain the reactor under maximum vacuum at 60° C. for approximately 1 hour 30 minutes, Break the vacuum by injecting nitrogen in the reactor, Check the NCO level, the Brookfield viscosity at 23° C. (No. 6 needle, speed 20 rpm) to 23° C. The viscosity at 23° C. of the resin part B ranges from 15,000 to 45,000 mPa·s.

mixing the two parts A and B: resin part A and hardener part B are mixed manually; the A/B ratio by mass is 100/90 and the A/B ratio by volume is 100/82; the NCO/OH ratio is of the order of 1.2. The Brookfield viscosity of the mixture obtained is of the order of 14,000-30,000 mPa·s.

Comparative Composition C1

Composition C1 is prepared as follows:

resin part A: resin part A of composition C1 is identical to that of composition 1.

The viscosity at 23° C. of resin part A ranges from 160,000 to 200,000 mPa·s.

hardener part B:

Hardener part B of composition C1 is prepared according to a process similar to that used for hardener part B of composition 1, except that a second polyfunctional polyol VORANOL® 1010L is introduced with the first polyfunctional polyol VORANOL® CP450, and the mixture of isocyanates SUPRASEC® 2004 is replaced by the mixture SUPRASEC® 5025.

The viscosity at 23° C. of the resin part B is of the order of 25,000 mPa·s.

mixing of the two parts A and B: resin part A and hardener part B are mixed by an automated process; the A/B ratio by mass is 100/55 and the A/B ratio by volume is 100/50; the NCO/OH ratio is of the order of 1.08.

Comparative Composition C2

Composition C2 is prepared as follows:

resin part A: resin part A of composition C2 is identical to that of composition 1.

The viscosity at 23° C. of resin part A ranges from 160,000 to 200,000 mPa·s.

hardener part B:

Hardener part B of composition C2 is prepared according to a process similar to that used for hardener part B of composition 1, the mixture of isocyanates SUPRASEC® 2004 being replaced by the mixture of isocyanates LUPRANAT® MIPI.

The viscosity at 23° C. of the resin part B is of the order of 58,000 mPa·s.

mixing the two parts A and B: resin part A and hardener part B are mixed by an automated process; the A/B ratio by mass is 100/55 and the A/B ratio by volume is 100/50; the NCO/OH ratio is of the order of 1.07.

Comparative Composition C3

Composition C3 is prepared as follows:

resin part A:

Resin part A of composition C3 is prepared according to a protocol similar to that of resin part A of composition 1, except for the steps of introduction of the fillers Millicarb® OG and Aerosil® R202 which are not reproduced.

hardener part B:

Hardener part B of composition C3 is prepared according to a protocol similar to that of hardener part B of composition C2.

The viscosity at 23° C. of the resin part B is of the order of 1,330 mPa·s.

mixing of the two parts A and B: resin part A and hardener part B are mixed by an automated process; the A/B ratio by mass is 100/60 and the A/B ratio by volume is 100/50; the NCO/OH ratio is of the order of 1.18.

Comparative Composition C4 composition C4 is prepared as follows:

resin part A:

Resin part A of composition C4 is prepared according to a protocol similar to that of composition 1 except for the steps of introduction of the fillers Millicarb® OG and Aerosil® R202 and of the water-absorbing material Siliporite® TMSA 1720 which are not reproduced.

hardener part B: hardener part B of composition C4 is identical to hardener part B of composition C3.

The viscosity at 23° C. of the resin part B is of the order of 1,330 mPa·s.

mixing the two parts A and B: resin part A and hardener part B are mixed by an automated process; the A/B ratio by mass is 100/61 and the A/B ratio by volume is 100/50; the NCO/OH ratio is of the order of 1.18.

Comparative Composition C5

Composition C5 is prepared as follows:

resin part A:

Resin part A of composition C5 is prepared according to a protocol similar to that of resin part A of composition 2.

hardener part B: hardener part B of composition C5 is identical to hardener part B of composition 2, except for the different MDI grade, the Isonate®M143 being replaced by the mixture of isocyanate LUPRANAT® MIPI. The viscosity at 23° C. of the resin part B is of the order of 16,500 mPa·s.

mixing the two parts A and B: resin part A and hardener part B are mixed manually; the A/B ratio by mass is 100/90; the NCO/OH ratio is of the order of 1.2.

Table 1 below indicates the proportions of each of the compounds of the different compositions prepared. The proportions are given respectively as a function of the total weight of resin part A on the one hand and as a function of the total weight of hardener part B on the other hand.

Compositions 1 and 2 are compositions according to the present invention.

Compositions C1, C2, C3, C4 and C5 are comparative compositions.

Measurement of the NCO Functionality

The NCO functionality is measured by a method comprising the reaction between the dicyclohexylamine and the isocyanate and the titration of the excess of amine with hydrochloric acid.

Procedure

In a 250 mL ground-necked Erlenmeyer flask with a stopper, weigh the isocyanate with a precision balance (accurate to within 0.1 mg), a variable test sample according to the NCO function level:

| assumed % NCO | Test sample |
| --- | --- |
| 0 to 2% | 1-2 g |
| 2 to 5% | 0.8 g |
| 5 to 10% | 0.5 g |
| 10 to 20% | 0.3 g |

Add 10 mL of anhydrous DMF (N,N'-dimethylformamide),

Add 10 mL of dicyclohexylamine solution (at 5% by volume in DMF) with an automatic burette, Stir until completely dissolved, a heating step may be necessary to allow dissolution, Leave to rest for 2 minutes, Add 40 mL of isopropyl alcohol to rinse the walls of the Erlenmeyer flask and the stopper, Add from 8 to 10 drops of a solution of bromocresol green, said solution being obtained by dissolving 0.100 g of bromocresol green in 1.5 mL of 0.1N soda until completely dissolved, and topping up to 100 mL with distilled water, Titrate with 0.1N hydrochloric acid (0.1N HCl solution in isopropyl alcohol) with an automatic burette (precision of the drop 0.01 to 0.02 mL) until with the colour changes from blue to yellow.

Calculation of the Percentage of NCO Functions

The percentage of NCO functions is expressed as follows:

$$\% \ NCO = \frac{N \times (B - A) \times 4.2}{P}$$

N corresponds to the titre of the solution of hydrochloric acid,

B corresponds to the volume in mL of hydrochloric acid poured for the reference test (titration of the dicyclohexylamine solution with hydrochloric acid without isocyanate), A corresponds to the volume in mL of hydrochloric acid poured for the actual test (with isocyanate), P corresponds to the weight in grams of isocyanate used during the test.

Measurement of the Brookfield Viscosity at 23° C.

The viscosity of the compositions according to the present invention and of the comparative compositions is measured using a Brookfield RVT viscosimeter at 23° C., according to the standard ISO 2555.

When the air has been driven out (when no more bubbles are rising), put the pistons in place and seal hermetically with a hammer. Push in the black inserts of the pistons.

Place the cartridge in a climatic enclosure adjusted to 23° C. for 2 hours.

Remove the dual cartridge from the enclosure at 23° C.

Remove the end piece and the plastic screw.

Place the dual cartridge in a gun (pneumatic dual cartridge gun).

Apply $6 \times 10^5$ Pa (6 bar) of pressure with the gun.

Purge the dual cartridge=balance the 2 sides; push the pistons of the dual cartridge until the products exit from the cartridge evenly.

Place the mixer (10/24 mixer) at the end of the cartridge, tighten it with the screw.

Purge the mixer into a paper cup (remove about twenty grams).

Without waiting, apply a horizontal line at least 25 cm in length to a piece of card placed vertically (always to be placed at $6 \times 10^5$ Pa (6 bar)).

The tendency to run is then determined visually. If the bead does not flow and it remains well rounded, "no run" will then be noted (marked "no" in Table 2). On the other hand, if the bead becomes deformed and creeps, the product is described as "flowing" (marked "yes" in Table 2).

The tendency to run is determined immediately after manufacture of parts A and B, then after a 2-week period of

TABLE 1

Adhesive compositions (mass percentage with respect to resin part A and to hardener part B respectively)

| | 1 | 2 | C1 | C2 | C3 | C4 | C5 |
|---|---|---|---|---|---|---|---|
| Resin part A | | | | | | | |
| Castor oil | 70.60 | 67.76 | 70.60 | 70.60 | 81.48 | 84.00 | 67.76 |
| Milicarb ® OG | 10.00 | 10.00 | 10.00 | 10.00 | — | — | 10.00 |
| Aerosil ® R202 | 4.00 | 3.50 | 4.00 | 4.00 | — | — | 3.50 |
| Realkyd ® XTR 10410 | 8.40 | 8.65 | 8.40 | 8.40 | 9.70 | 10.00 | 8.65 |
| Thixatrol ® ST | 4.00 | — | 4.00 | 4.00 | 5.82 | 6.00 | — |
| Diethylene glycol | — | 7.00 | — | — | — | — | 7.00 |
| Siliporite ® TMSA 1720 | 3.00 | 3.08 | 3.00 | 3.00 | 3.00 | — | 3.08 |
| Hardener part B | | | | | | | |
| Voranol ® CP450 | 21.50 | 15.57 | 3.28 | 23.08 | 16.53 | 16.53 | 22.38 |
| Voranol ® 1010L | — | — | 24.08 | — | — | — | — |
| Lupranat ® MIPI | — | — | — | 76.92 | 83.47 | 83.47 | 77.61 |
| Suprasec ® 5025 | — | — | 72.64 | — | — | — | — |
| Suprasec ® 2004 | 78.50 | — | — | — | — | — | — |
| Isonate ® M143 | — | 84.42 | — | — | — | — | — |
| 85% Phosphoric acid | — | 0.01 | — | — | — | — | 0.01 |
| Two-component adhesive composition A + B | | | | | | | |
| A/B Ratio by weight | 100/55 | 100/90 | 100/55 | 100/55 | 100/60 | 100/61 | 100/90 |
| A/B Ratio by volume | 100/50 | 100/82 | 100/50 | 100/50 | 100/50 | 100/50 | 100/83 |
| NCO/OH molar ratio | 1.08 | 1.2 | 1.08 | 1.07 | 1.18 | 1.18 | 1.2 |

The compositions prepared are then subjected to different performance tests.

Vertical Run Test

The tendency to run is determined visually.

The protocol is as follows:

Take an unused dual cartridge (2 compartments of 200 ml each with an end piece, a plastic screw and 2 pistons with inserts), fill one of the 2 compartments with the resin, the other with the hardener.

Tap the cartridge vertically so as to drive out the air bubbles incorporated during the filling of the cartridge.

storage at 40° C. of parts A and B of the adhesive compositions, in order to determine the stability during storage of the adhesive compositions.

Compositions 1 and 2 show no run, even after 2 weeks' storage at 40° C. On the other hand, the comparative compositions C3, C4 and C5 show run after 2 weeks' storage at 40° C.

Test of Pot Life of the Adhesive Compositions

The pot life is the time after which no further transfer of adhesive on a spatula is noted (the transfer can be characterized by the presence of threads). It is evaluated by periodically dipping a brand-new spatula in at least 2 cm of the mixture of parts A and B of the adhesive composition, as from 50% of the theoretical pot life. A first test makes it possible to approximately determine the pot life (corresponding to the theoretical pot life) then a second test starting half-way through the pot life found during the first test makes it possible to determine a much more accurate value.

Parts A and B, previously stored at 23° C., are mixed for approximately 30 to 60 seconds, the timer is started as soon as mixing is completed. Then, a spatula (wooden tongue depressor for medical use) is periodically dipped in the mixture, i.e. a brand-new spatula is dipped, then withdrawn from the mixture at regular time intervals; the pot life is the time displayed on the timer when there are no longer any threads between the spatula and the mixture when the spatula is withdrawn.

The foaming is therefore evaluated qualitatively by visualizing the presence or absence of bubbles after mixing and application of the adhesive composition.

Sealing Test

The sealing is evaluated by determining the percentage of salts removed by the membrane (rejection level). The quantity of salts is determined by measuring the conductivity of the water.

The test is carried out with a solution comprising 450 ppm by mass of sodium chloride in ultrapure water. The NaCl ion rejection is then determined by measuring the conductivity of the water after passing through the filtration cartridge.

Preferably, the filtration cartridge exhibits an NaCl ion rejection less than or equal to 2%. In fact, the filtration cartridge according to the invention must preferably have a sealing test result greater than 98% (see Table 2).

The results of the different tests carried out on adhesive compositions 1, 2, C1 C2, C3, C4 and C5 are presented in Table 2 below.

TABLE 2

Adhesive composition performance tests

|  | 1 | 2 | C1 | C2 | C3 | C4 | C5 |
|---|---|---|---|---|---|---|---|
| Shore A hardness | 72 | 87 | 75 | 62 | — | 52 | 72 |
| Pot life at 23° C. | 2 h 17 | 1 h 10 | 2 h | 3 h 30 | 3 h | 3 h | 1 h 56 |
| Foaming | No | No | No | No | No | Yes | Yes |
| Vertical run test immediately after formation of the composition | No | No | No | No | No | No | Yes |
| Vertical run test after 2 weeks' storage at 40° C. | No | — | No | No | Yes | Yes | Yes |
| Sealing test | >98% | >98% | poor | <95% | — | — | — |

Shore a Hardness Measurement

The method used to report the reactivity of the adhesives when hot is measurement of the Shore A hardness after curing for 2 hours at 60° C.

The adhesive composition is extruded into a cup (48 mm in diameter, joint thickness approximately 9 mm). Then, the cup of adhesive is placed in a ventilated oven at 60° C. for 2 hours and is then stored at 23° C. The Shore A hardness measurement is carried out after 7 days at 23° C. with a Shore A-type durometer—Zwick equipment ASTM D 2240 A; DIN 53505; ISO 868. The hardness corresponds to the value read 15 seconds after the penetration of the tip of the durometer into the adhesive composition (3 measurements are systematically carried out).

Evaluation of Foaming

By nature the polyurethanes are sensitive to humidity (the isocyanates react with the air humidity producing the release of gaseous $CO_2$).

The foaming corresponds to the presence of a multitude of bubbles, the size of which is less than a millimetre, distributed regularly in the structure of the adhesive composition.

Although the most favourable reaction is that between the isocyanates and the polyols, a significant risk of foaming may occur when the air humidity is very high. Now, in the case of the manufacture of filter cartridge, the air humidity can be very high, in fact, the membrane is preferably handled under conditions of high humidity.

The presence of foaming in the adhesive joint can be particularly critical and detrimental as it may not only weaken the adhesive joint but also impair the sealing of the filtration cartridge (potential leak source).

Other Characteristics of Adhesive Composition 1 According to the Invention

The densities of resin part and of the hardener part respectively were measured using a pycnometer.

The density of resin part A of the adhesive composition 1 is 1.06 g/cm$^3$ and the density of hardener part B of the adhesive composition 1 is 1.13 g/cm$^3$.

The density is determined by measuring the weight of liquid occupying the volume of the pycnometer at the required temperature.

The procedure is as follows:

Weigh the empty, dry pycnometer on a precision balance accurate to within 1/10 gram: i.e. T1.

Open the pycnometer of volume V and the fill to the brim with the liquid the density of which is to be measured, then close the pycnometer again.

Wipe the surplus from the flow orifice with absorbent paper.

Weigh the pycnometer again: i.e. T2.

The density is therefore equal to (T2−T1)/V.

Wijs Method

The unsaturation level is determined by the Wijs method and is expressed in Wijs units. The Wijs method is described in detail below for determining the unsaturation level of a fatty acid but the method can be transposed to any other unsaturated compound, such as a type-$P_1$ polyol defined in the present application.

Experimentally, in order to determine the unsaturation level of an unsaturated fatty acid, the procedure is as follows:

This method uses Wijs reagent, which is an iodine monochloride I—Cl solution. The Wijs reagent is then reacted, a known excess of which is placed on an unsaturated fatty acid represented by the general formula R—CH=CH—R'; I—Cl binds to the double bonds according to the following reaction:

R—CH=CH—R'+I—Cl=>R—CHI—CHCl—R'

The excess of reagent remains in solution, then a large excess of potassium iodide is added (this compound also serves to solubilize the free diiodine) which combines with I—Cl releasing diiodine according to the following reaction:

I—Cl+I⁻=>I₂+Cl⁻

Thus the released diiodine is assayed with a solution with a known molar concentration of thiosodium sulphate, in the presence of starch paste, added at the end of the assay. The reactions are shown in detail below:

$I_2 + 2e^- = 2I^-$ $2S_2O_3^{2-} = S_4O_6^{2-} + 2e^-$ $I_2 + 2S_2O_3^{2-} = > S_4O_6^{2-} + 2I^-$

A control test is carried out under the same conditions, but without unsaturated fatty acid, in order to be able to determine the quantity of diiodine which has saturated the double bonds. Dry equipment must be used as I—Cl is destroyed by water.

Thus, by determining the quantity of released diiodine, the quantity of I—Cl which has saturated the double bonds is deduced from this, then the unsaturation level then expressed in Wijs units is deduced from this.

Of course, the present invention is not limited to the examples and the embodiments described and represented, but is capable of numerous variants accessible to a person skilled in the art.

The invention claimed is:

1. An adhesive composition comprising:
   a composition A comprising:
      at least one unsaturated polyol $P_1$ having a number-average molecular weight ranging from 290 to 1500 g/mol, a hydroxyl value ranging from 110 mgKOH/g to 600 mgKOH/g and an unsaturation level less than or equal to 150 Wijs
      from 5 to 20% by weight of at least one filler, with respect to the total weight of composition A,
      at least one amorphous polyester,
      at least one saturated polyol $P_2$,
   a composition B comprising at least one prepolymer with NCO terminations, obtained from:
      i. at least one polyfunctional polyol $P_3$ that is a polypropylene glycol or a polyethylene glycol, and at least one mixture of isocyanates comprising at least 60% by weight of 4,4'-diphenylmethylene diisocyanate with respect to the total weight of the mixture of isocyanates, or
      ii. at least one polyfunctional polyol $P_3$, and at least one mixture of isocyanates comprising 60 to 90% by weight of 4,4'-diphenylmethylene diisocyanate and from 10 to 40% by weight of 2,4'-diphenylmethylene diisocyanate, with respect to the total weight of the mixture of isocyanates, or
      iii. at least one polyfunctional polyol $P_3$ that is a polypropylene glycol or a polyethylene glycol, and at least one mixture of isocyanates comprising at least 60% by weight of 4,4'-diphenylmethylene diisocyanate and from 10 to 40% by weight of 2,4'-diphenylmethylene diisocyanate with respect to the total weight of the mixture of isocyanates.

2. The composition according to claim 1, comprising a composition A in which:
   the polyol $P_1$ is selected from the polyester polyols, and/or
   the filler has a particle sizes ranging from 1 to 10 μm, and/or
   the amorphous polyester is selected from the aliphatic, cycloaliphatic and aromatic polyesters obtained from diacids and of dialcohols, and/or
   the polyol $P_2$ is selected from:
      a saturated polyol having a number-average molecular weight ranging from 500 to 1500 g/mol, a hydroxyl value ranging from 100 mgKOH/g to 300 mgKOH/g, or
      a saturated polyol having a number-average molecular weight less than or equal to 300 g/mol.

3. The composition according to claim 1, in which composition A comprises:
   from 50 to 90% by weight of the at least one unsaturated polyol $P_1$ having a number-average molecular weight ranging from 290 to 1500 g/mol, a hydroxyl value ranging from 110 mgKOH/g to 600 mgKOH/g and an unsaturation level less than or equal to 150 Wijs
   from 5 to 20% by weight of the at least one filler,
   up to 10% by weight of the at least one material capable of adsorbing water,
   from 2 to 20% by weight of the at least one amorphous polyester,
   from 1 to 15% by weight of the at least one saturated polyol $P_2$, with respect to the total weight of composition A.

4. The composition according to claim 1, comprising a composition B in which:
   the polyfunctional polyol $P_3$ of ii is a polypropylene glycol or a polyethylene glycol.

5. The composition according to claim 1, in which the prepolymer is obtained from:
   10 to 40% by weight of the at least one polyfunctional polyol $P_3$,
   60 to 90% by weight of the mixture of isocyanates comprising at least 60% by weight of 4,4'-diphenylmethylene diisocyanate, and
   10 to 40% by weight of 2,4'-diphenylmethylene diisocyanate, with respect to the total weight of the mixture of isocyanate.

6. The composition according to claim 1, having a ratio of the number of NCO units in the composition B to the number of OH units in composition A of 1 to 1.5.

7. The composition according to claim 1, having a Brookfield viscosity measured at 23° C. of composition A is 10,000 to 200,000 mPa·s, and a Brookfield viscosity measured at 23° C. of composition B is 10 to 100,000 mPa·s.

8. The composition according to claim 1, in which the saturated polyol $P_2$ has a number-average molecular weight of 500 to 1500 g/mol and a hydroxyl value of 100 mgKOH/g to 300 mgKOH/g.

9. The composition according to claim 8, having a Brookfield viscosity measured at 23° C. of composition A of 100,000 to 200,000 mPa·s, and a Brookfield viscosity measured at 23° C. of composition B of 10,000 to 100,000 mPa·s.

10. The composition according to claim 1, in which the saturated polyol $P_2$ has a number-average molecular weight less than or equal to 300 g/mol.

11. The composition according to claim 10, having a Brookfield viscosity measured at 23° C. of composition A of 10,000 to 30,000 mPa·s, and a Brookfield viscosity measured at 23° C. of composition B of 10,000 to 50,000 mPa·s.

12. A ready-to-use kit comprising the adhesive composition according to claim 1, compositions A and B being packaged in two separate compartments.

13. A method for the manufacture of reverse osmosis filtration cartridges comprising a step of using the composition according to claim 1.

14. A process for manufacturing filtration cartridges comprising:
   a) supplying a membrane (2),
   b) folding the membrane obtained in step a),
   c) inserting a drainage fabric (3) between the two folds (2a) and (2b) of the membrane of step b) thus forming a section,
   d) supplying a collection tube onto which at least one first spacer (1) is partially wound,
   e) mixing compositions A and B of an adhesive composition (4) according to claim 1,
   f) applying the adhesive composition (4) prepared in step e) to the inner face of a first spacer (1),
   g) depositing the section obtained at the end of step c) on the spacer coated with the adhesive composition (4), the closed side of the section being inserted along the collection tube,
   h) applying the adhesive composition (4) prepared in step e) to the upper face of the section inserted in step g),
   i) applying a second spacer (1') to the multilayer structure obtained in step h),
   j) optionally the repetition of steps f) to i),
   k) winding the multilayer structure obtained at the end of steps a) to j) comprising at least two spacers (1) and (1'), at least one membrane (2) and at least one drainage fabric (3) around the collection tube,
   l) blocking the winding originating from step k) in order to obtain the filtration cartridge.

15. The process of manufacture according to claim 14, in which steps e) and f) are automated.

* * * * *